United States Patent [19]

Sato

[11] Patent Number: 5,109,962
[45] Date of Patent: May 5, 1992

[54] TRANSMISSION RATIO CONTROL SYSTEM FOR A CONTINUOUSLY VARIABLE TRANSMISSION

[75] Inventor: Keiji Sato, Tokyo, Japan
[73] Assignee: Fuji Jukogyo Kabushiki Kaisha, Tokyo, Japan
[21] Appl. No.: 633,000
[22] Filed: Dec. 21, 1990

[30] Foreign Application Priority Data

Dec. 28, 1989 [JP] Japan .................................. 1-343306
Dec. 28, 1989 [JP] Japan .................................. 1-343307

[51] Int. Cl.$^5$ .................................................. B60K 41/26
[52] U.S. Cl. .............................. 192/4 A; 188/181 A; 192/1.23; 364/426.02
[58] Field of Search .................. 192/4 A, 7, 1.23; 188/181 A, 181 C, 181 T; 364/426.02, 424.1

[56] References Cited

U.S. PATENT DOCUMENTS 4,039,061  8/1977  Pruvot et al. ....................... 192/4 A
5,012,910  5/1991  Miyawaki ........................... 192/4 A

FOREIGN PATENT DOCUMENTS 53-24687  7/1978  Japan .................................. 192/4 A Primary Examiner—Leslie A. Braun
Assistant Examiner—Andrea Pitts
Attorney, Agent, or Firm—Martin A. Farber

[57] ABSTRACT

A belt drive continuously variable transmission has a drive pulley operatively connected to an engine and a driven pulley operatively connected to wheels of a motor vehicle, hydraulic cylinders for changing effective diameters of both pulleys, and a transmission ratio control valve for producing a primary pressure applied to the cylinder for controlling transmission ratio. An antilock brake system is provided on the vehicle. A memory is provided for storing a plurality of ABS desired transmission ratios for use during operation of the antilock brake system. During the operation of the antilock brake system, an ABS desired transmission ratio is derived from the memory. The transmission ratio is controlled with the ABS desired transmission ratio.

4 Claims, 8 Drawing Sheets

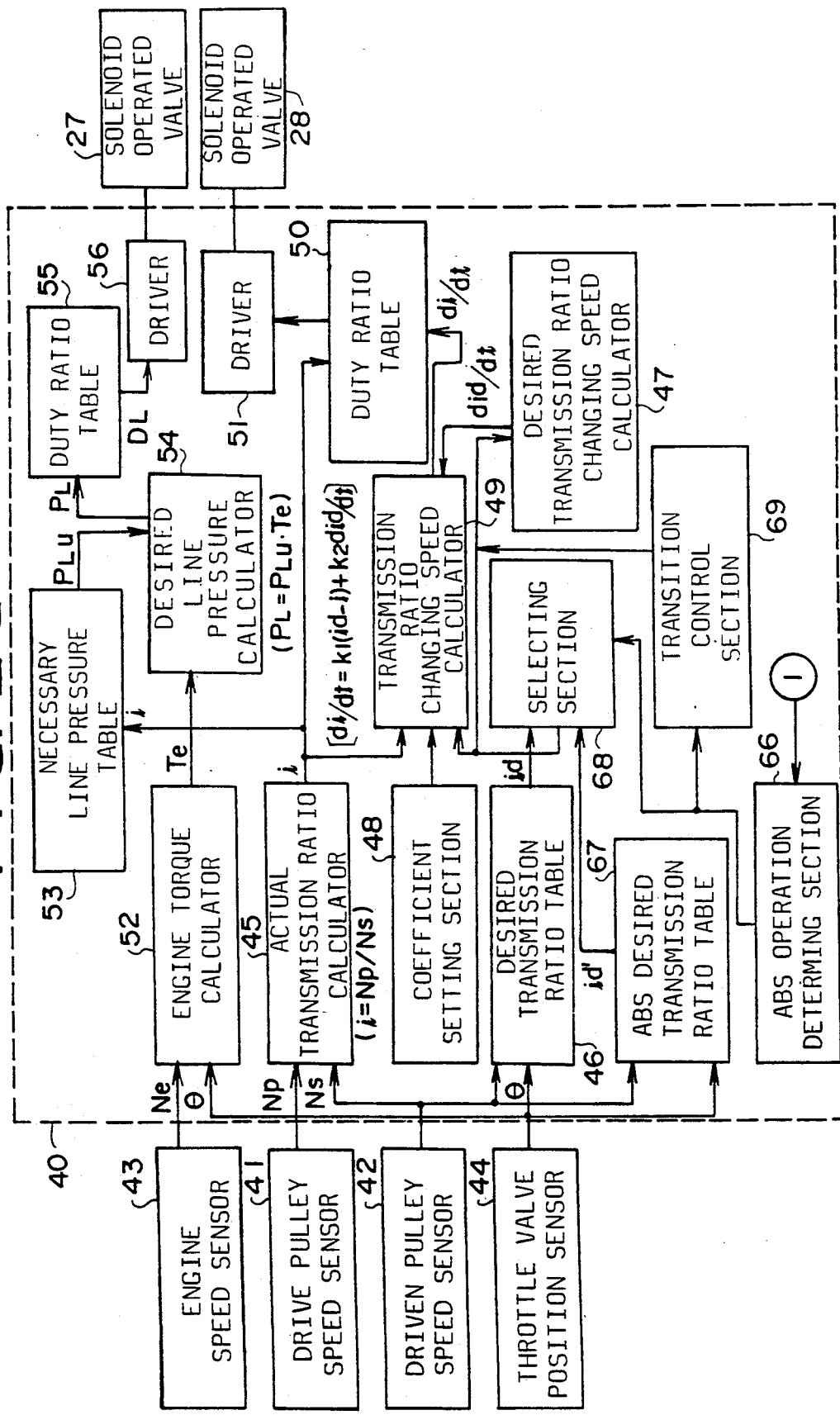

FIG. 4a
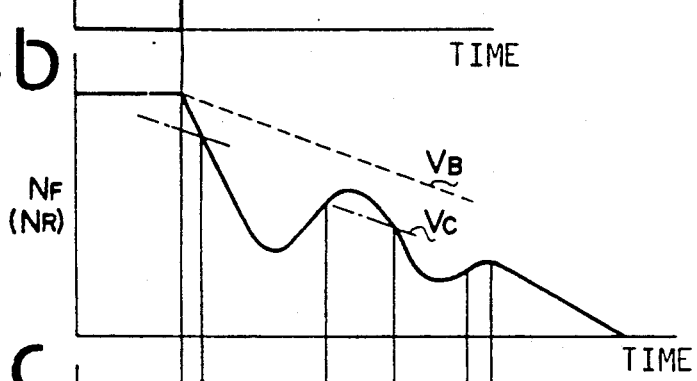
FIG. 4b
FIG. 4c
FIG. 4d
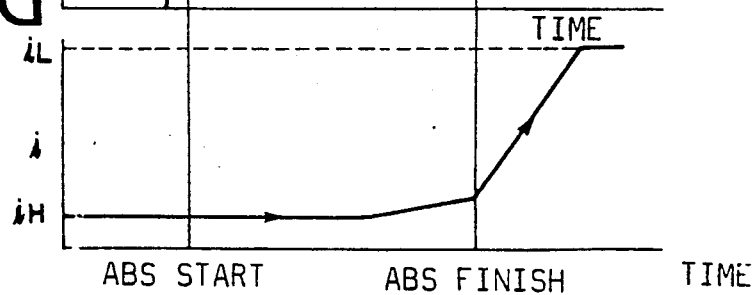
FIG. 4e
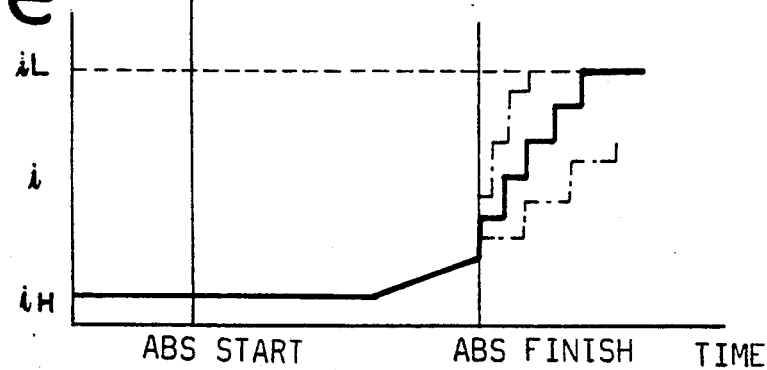

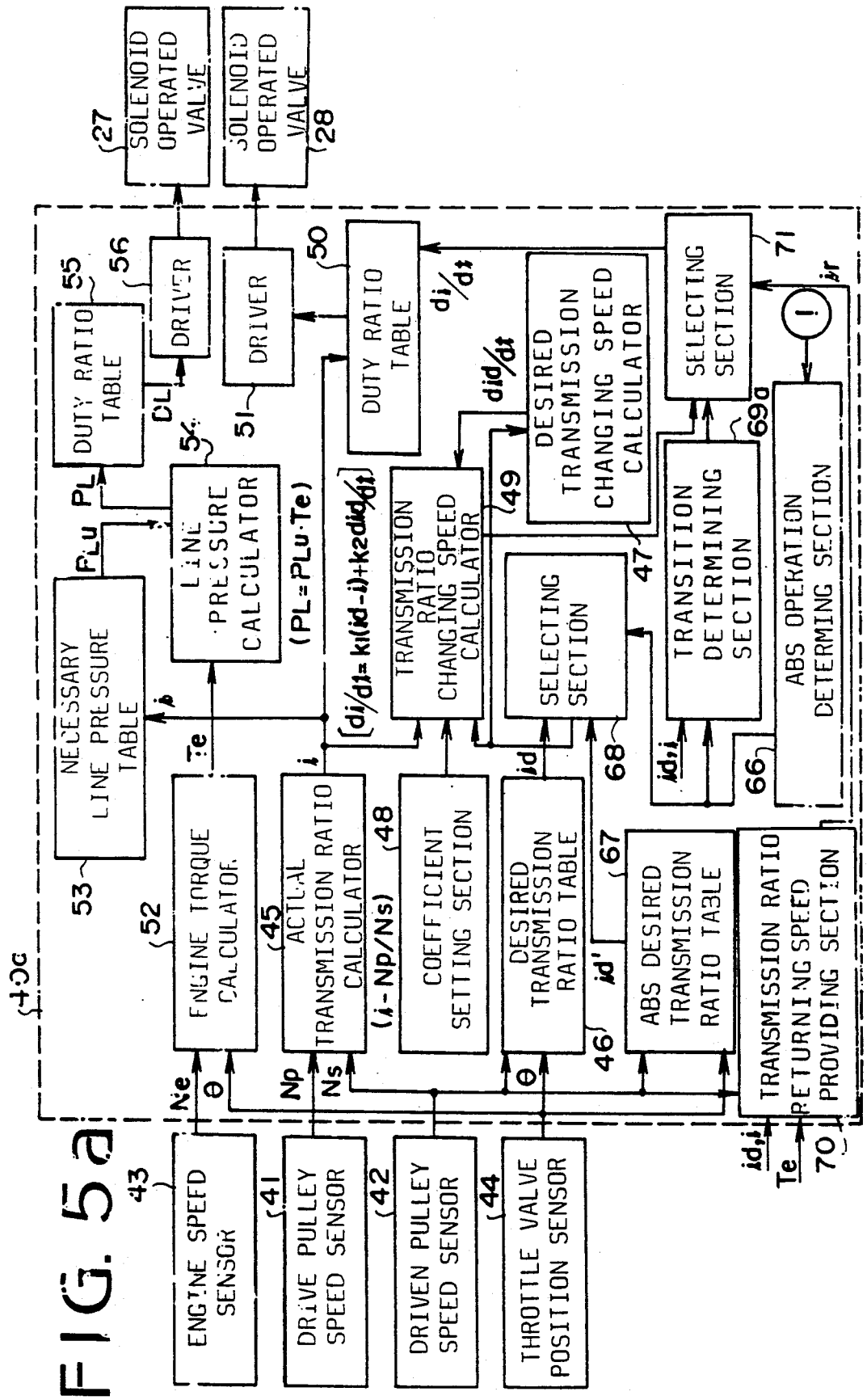

TRANSMISSION RATIO CONTROL SYSTEM FOR A CONTINUOUSLY VARIABLE TRANSMISSION

BACKGROUND OF THE INVENTION

The present invention relates to a system for a transmission ratio control system for a continuously variable belt-drive automatic transmission having an antilock brake system, and more particularly to the system for controlling the transmission ratio during and after an operation of the antilock brake system.

It has become popular to provide an antilock brake system (hereinafter called ABS) on a motor vehicle in order to prevent wheels from locking when the vehicle is braked on a road having a low coefficient of friction, thereby improving directional stability and handling of the vehicle. The ABS electronically controls a pressure of brake fluid and wheel speed to prevent wheel lock. However, in a vehicle provided with a continuously variable belt-drive transmission where transmission ratio and line pressure are precisely controlled in accordance with the wheel speed and other factors, the operation of the ABS influences the control of the transmission a lot. Hence it is preferable to control both the ABS and the transmission when the ABS is operated.

More particularly, it is preferable to control the transmission ratio during the operation of the ABS where the wheel speed rapidly decreases and fluctuates. In the control system of the continuously variable transmission, the transmission is upshifted in accordance with an increase of vehicle speed (speed of the wheels which is considered as the vehicle speed), and downshifted with a decrease thereof. Therefore, when the vehicle is rapidly decelerated, the transmission is rapidly downshifted. When the pressure of the brake fluid in the ABS is reduced, and the wheel speed increases, the transmission is upshifted. Thus the transmission ratio fluctuates during the operation of the ABS. Such fluctuation of the transmission ratio causes vibration of the vehicle, which decreases the durability of a belt of the transmission. Moreover, the pseudo vehicle speed dependent on speed of the wheels does not coincide with the actual vehicle speed so that the ABS cannot be appropriately operated. Thus it is preferable to control the transmission ratio regardless of the wheel speed during the operation of the ABS.

Japanese Patent Publication 53-24687 discloses a control system of the transmission ratio during the operation of the ABS. In the system, the transmission ratio changing speed is decreased when a slipping rate of driving wheels on a road surface is under a predetermined value, so as to restrain the slipping of the wheels. Namely, the system relates to a control of traction at acceleration of the vehicle to prevent the slipping of the wheels and does not solve the above-described problems.

There is another problem concerning the transmission ratio in relation to the operation of the ABS. The ABS is generally operated when the locking of the wheels is anticipated when depressing a brake pedal. Such a wheel-lock state is liable to occur in a small transmission ratio in a high engine speed range. Therefore, it is necessary to change the transmission ratio with a small value at a high speed gear. In addition, at a time when the operation of the ABS stops, there may be a large difference between the actual transmission ratio and the desired transmission ratio. Therefore, if the transmission ratio is rapidly changed to the desired ratio, trouble may occur. Thus it is desirable to smoothly change the transmission ratio after the operation of the ABS.

SUMMARY OF THE INVENTION

The object of the present invention is to provide a transmission ratio control system for a continuously variable transmission where the transmission ratio is appropriately controlled during and after operation of an ABS.

According to the present invention, there is provided a system for controlling the transmission ratio of a continuously variable belt-drive transmission connected to an engine mounted on a motor vehicle, having a drive pulley with a hydraulically shiftable disc and a primary hydraulic cylinder for shifting the disc, a driven pulley including a hydraulically shiftable disc and a secondary hydraulic cylinder for shifting the disc thereof, a belt engaged with both pulleys, a hydraulic circuit for supplying oil from a pump to the cylinders, a transmission ratio control valve for controlling a primary pressure applied to the primary cylinder, a line pressure control valve for controlling a secondary pressure applied to the secondary cylinder, a throttle position sensor for producing a throttle opening degree signal, speed sensors for detecting speeds of the drive and driven pulley and the engine respectively and for producing respective speed signals, actual transmission ratio calculating means responsive to the drive pulley speed signal and the driven pulley speed signal for calculating an actual transmission ratio and for producing an actual transmission ratio signal, desired transmission ratio calculating means responsive to the driven pulley speed signal and the throttle opening degree signal for calculating a desired transmission ratio and for producing a desired transmission ratio signal, valve operating means responsive to the actual transmission ratio signal and the desired transmission ratio signal for operating the transmission ratio control valve so as to control the transmission ratio to the desired transmission ratio, and an antilock brake system.

The system comprises ABS operation detector means for detecting an output signal of the antilock brake system and for producing an ABS signal, storing means for storing a plurality of ABS desired transmission ratios during an operation of the antilock brake system, selecting means responsive to the ABS signal for obtaining an ABS desired transmission ratio from the storing means in place of the desired transmission ratio and for applying the ABS desired transmission ratio to the valve operating means, the ABS desired transmission ratios being arranged to slowly control the actual transmission ratio to the ABS desired transmission ratio.

In an aspect of the invention, the system further comprises transition control means responsive to disappearance of the ABS signal for slowly returning the actual transmission ratio to the desired transmission ratio.

Other objects and features of this invention will become understood from the following description with reference to the accompanying drawings.

BRIEF DESCRIPTION OF THE DRAWINGS

FIGS. 2a and 2b show a block diagram of a control unit of the present invention;

FIGS. 4a to 4e show characteristics of a brake system and transmission ratios in a first embodiment and a second embodiment of the present invention, respectively with respect to the operation of the ABS;

FIGS. 5a and 5b show a block diagram of a control unit of the second embodiment of the present invention.

DETAILED DESCRIPTION OF THE PREFERRED EMBODIMENTS

Figure 1:
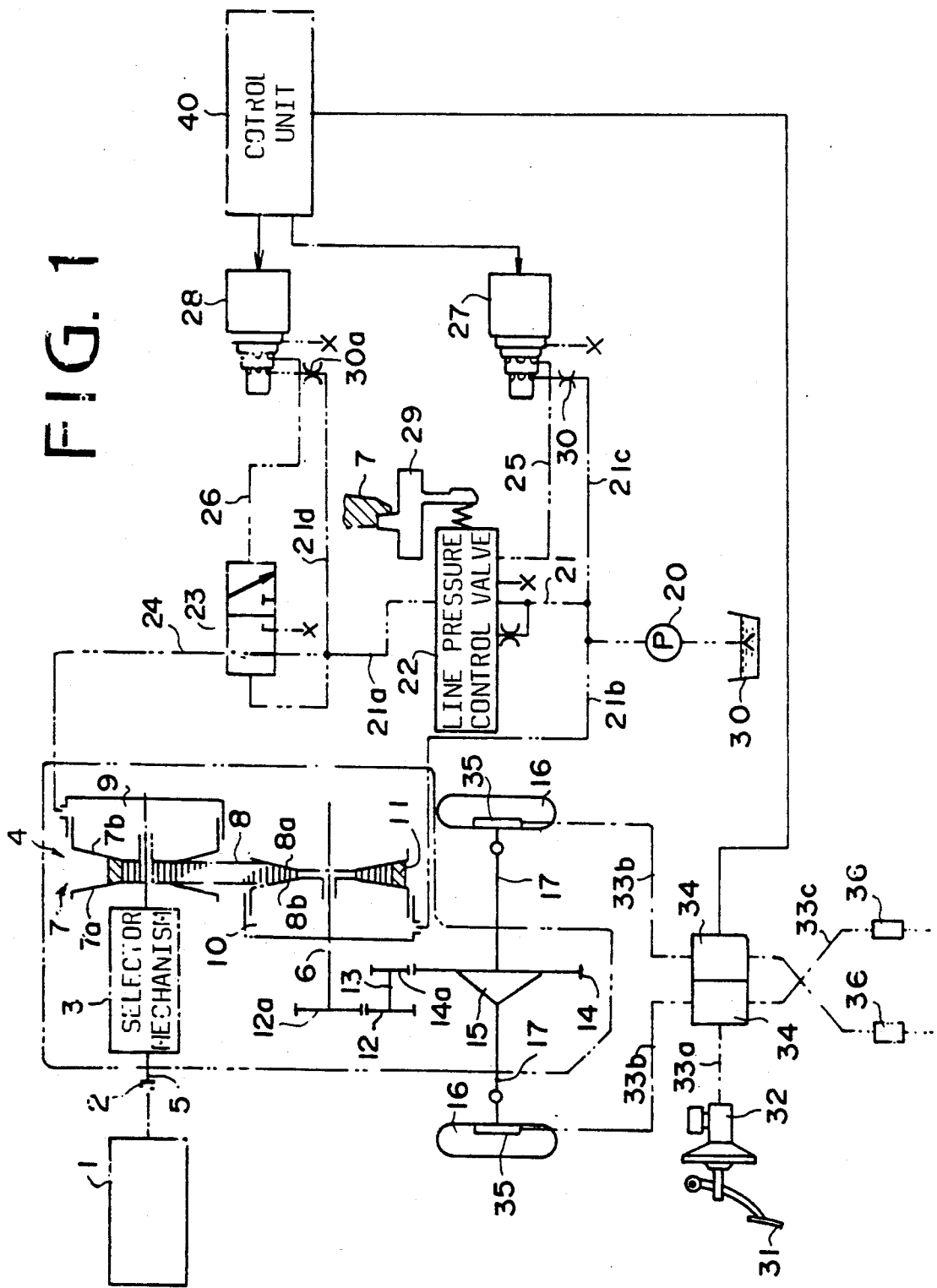
FIG. 1 shows a schematic diagram of a continuously variable belt-drive transmission to which the present invention is applied, and a hydraulic control circuit thereof.

Referring to FIG. 1, a continuously variable belt-drive automatic transmission for a motor vehicle, to which the present invention is applied, comprises an automatic clutch 2 for transmitting power of an engine 1 to a belt-drive continuously variable transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on the main shaft 5 and output shaft 6, respectively. A fixed conical disc 7a of the drive pulley 7 is integral with the main shaft 5 and an axially movable conical disc 7b is axially slidably mounted on the main shaft 5. The movable conical disc 7b also slides in a primary cylinder 9 formed on the main shaft 5 to provide a servo device.

A fixed conical disc 8a of the driven pulley 8 is formed on the output shaft 6 opposite to the movable conical disc 7b and a movable conical disc 8b is slidably mounted on the shaft 6 opposite to the disc 7a. The movable conical disc 8b has a cylindrical portion which is slidably engaged in a secondary cylinder 10 of the output shaft 6 to form the servo device. A drive belt 11 engages with the drive pulley 7 and the driven pulley 8. The cylinder 9 of the drive pulley 7 is so designed that a pressure receiving area is larger than that of the cylinder 10 of the driven pulley 8. Thus, the running diameter of the belt 11 on the pulleys 7, 8 is varied dependent on driving conditions.

Secured to the output shaft 6 is a drive gear 12a which engages with an intermediate reduction gear 12 on an intermediate shaft 13. An intermediate gear 14a on the shaft 13 engages with a final reduction gear 14. The rotation of the final reduction gear 14 is transmitted to axles 17 of vehicle driving wheels 16 through a differential 15.

Describing a hydraulic control circuit, oil in an oil reservoir 30 is supplied to a line pressure control valve 22 through a line pressure passage 21 by an oil pump 20. The oil pump 20 further is connected with the cylinder 10 of the 25 driven pulley 8 through a passage 21b. The line pressure control valve 22 is communicated with a transmission ratio control valve 23 through a passage 21a. The cylinder 9 of the drive pulley 7 is applied with pressurized oil through the passage 21, the line pressure control valve 22, the passage 21a, the transmission ratio control valve 23, and a passage 24. A conduit 25 is connected between the line pressure control valve 22 and a solenoid operated on-off valve 27. A conduit 26 is connected between the transmission ratio control valve 23 and a solenoid operated on-off valve 28. The solenoid operated valve 27 is 10 connected with the pump 20 through a passage 21c having an orifice 30, and the valve 28 is communicated with the passage 21a through a passage 21d having an orifice 30a.

The solenoid operated valve 27 is adapted to be operated by duty signals from the control unit 40 for producing control pressure in the form of pulses. The control pressure is applied to the line pressure control valve 22. The line pressure control valve 22 is connected with a sensor shoe 29 through a spring retainer. The sensor shoe 29 is engaged with the movable disk 7b of the drive pulley 7 so as to detect an actual transmission ratio i. Thus, a line pressure $P_L$ is controlled in accordance with the transmission ratio i, and an engine torque Te.

The solenoid operated valve 28 is also operated by the duty signals and produces reducing pressure which is applied to the transmission ratio control valve 23 for shifting a spool of the valve 23 to an oil supply position and an oil drain position by a degree of the duty ratio. Thus, the flow rate Q of the oil supplied to or drained from the cylinder 9 of the drive pulley 7 is controlled to provide an optimum transmission ratio i.

Describing a brake system having an ABS, a brake pedal 31 is connected to a master cylinder 32 for producing fluid pressure in accordance with the depression degree of the brake pedal 31. The master cylinder 32 is communicated with a pair of modulators 34 of the ABS through a pipe 33a. A pipe 33b from each modulator 34 is communicated with a brake device 35 of each driving wheel 16. The modulator 34 is further communicated with a brake device of the driven wheels (not shown) through a proportioning valve 36 for adjusting the fluid pressure to the driven wheels. The modulator 34 has various solenoid valves for respectively reducing the pressure, increasing and holding the pressure, so as to control the brake fluid pressure when the antilock brake system is in operation in accordance with a signal from a control unit 40.

Figure 2B:
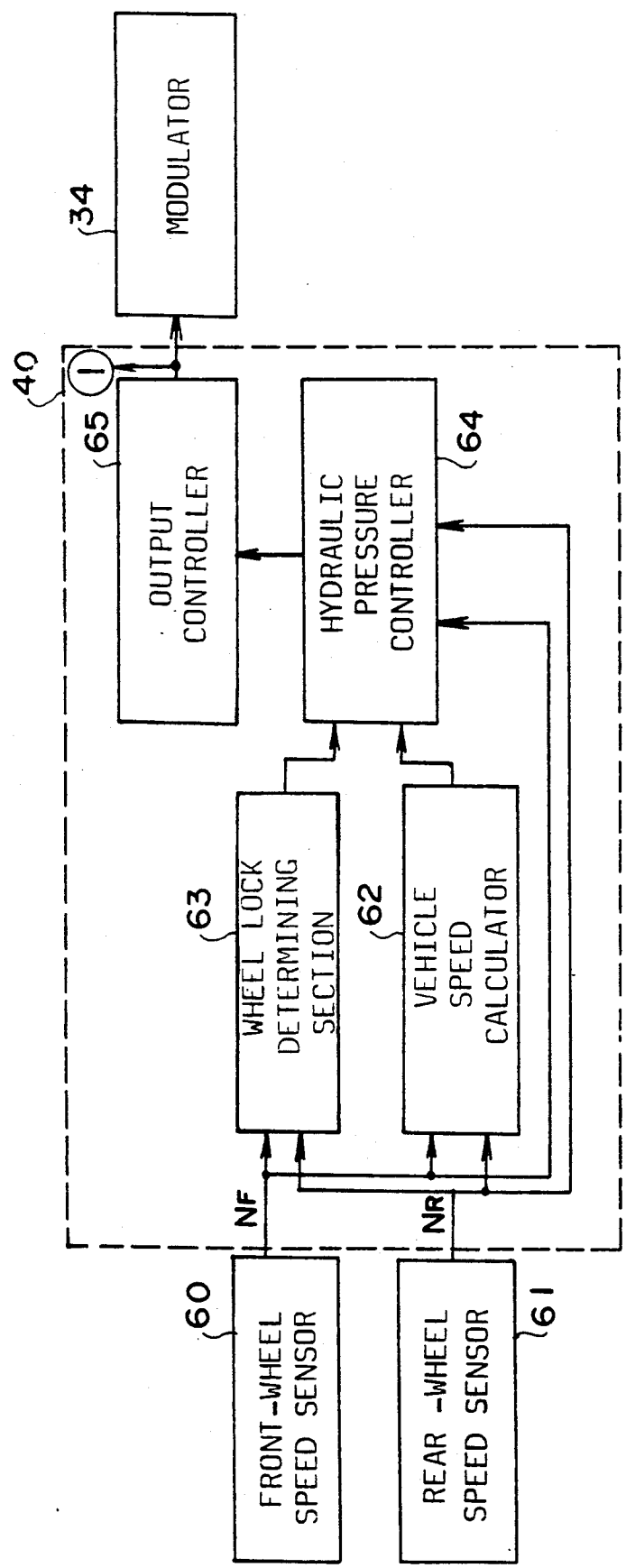

Referring to FIGS. 2a and 2b, the system is arranged to control the transmission ratio i, the line pressure $P_L$ and the ABS modulator. In the system, an engine speed sensor 43, a drive pulley speed sensor 41, a driven pulley speed sensor 42 and a throttle position sensor 44 are provided.

Output signals $N_P$ and $N_S$ of the sensors 41, 42 are fed to an actual transmission ratio calculator 45 to produce an actual transmission ratio i in accordance with $i = N_P/N_S$. Output signal $N_S$ and output signal $\theta$ representing the opening degree of the throttle position sensor 44 are fed to a desired transmission ratio table 46. A desired transmission ratio id is derived from the table 46 in accordance with the signals $N_S$ and $\theta$. The desired transmission ratios id are set in dependency on a desired transmission ratio changing pattern.

The desired transmission ratio id is fed through a selecting section 68 to a desired transmission ratio changing speed calculator 47 which produces a desired transmission ratio changing speed did/dt. The speed did/dt is a changing amount of the desired transmission ratio id during a predetermined time interval $\Delta t$. The actual transmission ratio i, the desired transmission ratio id, the desired transmission ratio changing speed did/dt and coefficients K1 and K2 obtained at a coefficient setting section 48 are applied to a transmission ratio changing speed calculator 49 to produce a transmission ratio changing speed (rate) di/dt from the formula as follows.

$$di/dt = K1(id - i) + K2 \cdot did/dt$$

In the formula, K1(id−i) is a controlling amount dependent on the difference between the desired transmission ratio id and the actual transmission ratio i, and did/dt is a phase advancing correction factor for eliminating delay in the operation of the system. Namely, the desired transmission ratio changing speed did/dt dependent on the system is added to the controlling amount as a phase advancing factor. Thus a feedforward control is performed to correct the delay, thereby improving convergence.

The speed di/dt and the actual ratio i are applied to a duty ratio table 50 to derive a duty ratio D in accordance with D=f (di/dt, i) using a table at upshift and downshift of the transmission.

The duty ratio D is set at a larger value than 50% for upshifting the transmission and at a smaller value than 50% for downshifting. When upshifting the transmission, the duty ratio D is a decreasing function of the actual transmission ratio i and an increasing function of the transmission changing speed |di/dt|. To the contrary, when downshifting the transmission, the duty ratio D is determined as an increasing function of the actual transmission ratio i and a decreasing function of the transmission ratio changing speed di/dt. The duty ratio D is supplied to the solenoid operated on-off valve 28 through a driver 51.

Further, the throttle position signal θ and the engine speed signal Ne are fed to an engine torque calculator 52, so that the engine torque Te is calculated based on the throttle position θ and engine speed Ne.

On the other hand, the actual transmission ratio i from the calculator 45 is applied to a necessary line pressure table 53 to derive a necessary line pressure $P_{LU}$ per unit torque. The necessary line pressure $P_{LU}$ and the input torque Te are applied to a desired line pressure calculator 54 where a desired line pressure $P_L$ is calculated by $P_L = P_{LU} \times Te$. The desired line pressure $P_L$ is applied to a duty ratio table 55 to derive a duty ratio $D_L$ corresponding to the desired line pressure $P_L$. The duty ratio $D_L$ is supplied to a driver 56 which operates the solenoid operated on-off valve 27 at the duty ratio.

For controlling the ABS, a vehicle speed calculator 62 is fed with a front-wheel speed NF from the front-wheel speed sensor 60 and a rear-wheel speed NR from the rear-wheel speed sensor 61. A vehicle speed V is calculated as an average of the wheel speeds NF and NR. A wheel lock determining section 63 is applied with the wheel speeds NF and NR for detecting the wheel lock condition. The wheels may be locked when the deceleration dN/dt of the wheel speed NF or NR is extremely large. A lock signal from the determining section 63 and the vehicle speed V are applied to a hydraulic pressure controller 64 for controlling the modulator 34 through an output controller 65.

When the wheel speed NF or NR is smaller than a pseudo vehicle speed Vc so that the wheel may be locked, the controller 64 produces a pressure reducing signal to reduce the hydraulic pressure.

When the wheel speed restores, a signal to increase the hydraulic pressure is produced. The output controller 65 applies an ABS signal based on the signals to the solenoid valves in the modulator 34. By repeating this operation, locking of the wheels can be prevented.

A system for controlling the transmission ratio during the operation of the ABS and thereafter is hereinafter described.

The control unit 40 is further provided with an ABS operation determining section 66 to which the ABS signal from the output determining section 65 is fed to determine whether the ABS is being operated or that the operation is finished. An ABS desired transmission ratio table 67 is further provided. The desired transmission ratio table 46 stores the desired transmission ratios id for normal driving conditions, whereas the ABS desired transmission ratio table 67 stores a plurality of ABS desired transmission ratios id' appropriate for the operation during and after the ABS operation. A desired transmission ratio id' is derived from the table 67 in accordance with the driven pulley speed $N_S$ and the throttle opening degree θ and fed to the selecting section 68. When an ABS operation signal is fed from the ABS operation determining section 66 to the selecting section 68, the desired transmission ratio id' for the ABS is applied to the transmission ratio changing speed calculator 47 and 49 instead of the transmission ratio id. Thus the transmission ratio changing speed di/dt is calculated based on the difference between the desired transmission ratio id' and the actual transmission ratio i.

Figure 3:
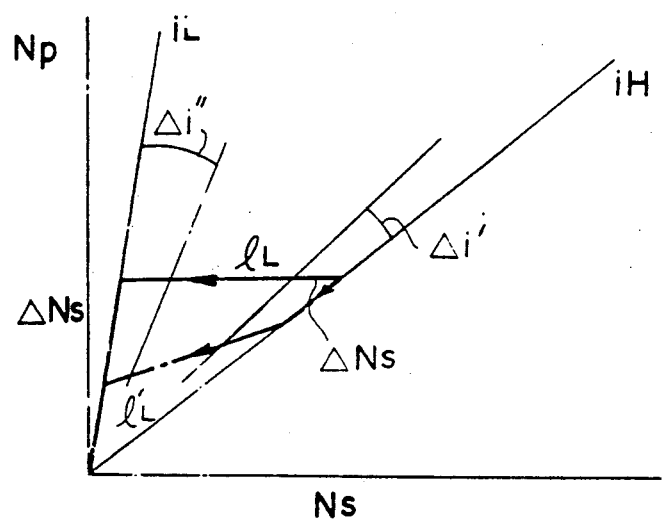
FIG. 3 is a graph showing a relationship between drive pulley speed and driven pulley speed.

Referring to FIG. 3, there is provided the smallest transmission ratio iH and the largest transmission ratio iL in the table 46. The transmission is arranged to be downshifted from the smallest ratio iH to the largest ratio iL along a minimum transmission ratio changing line lL at a low primary pulley speed. Comparing transmission ratio changing quantity Δi″ with respect to decreasing quantity $\Delta N_S$ of the driven pulley speed $N_S$ at the side of the largest transmission iL with transmission ratio changing quantity Δi′ with respect to the same speed $N_S$ at the side of the smallest transmission ratio iH, the quantity Δi′ at the smallest ratio iH is smaller than the quantity Δi″ at the largest ratio iL. Hence, in order to decrease a transmission ratio changing rate when the ABS is operated, the desired transmission ratio is determined at a value where $\Delta i / \Delta N_S$ is small, namely at a value close to the smallest transmission ratio iH. Thus the desired transmission id' for the ABS operating condition changes along a minimum transmission ratio changing line i'L shown by a dash-dotted line. More particularly, the desired transmission ratio id' is maintained at the smallest transmission ratio iH for some time and thereafter, increased to gradually decrease the drive pulley speed $N_P$. The desired transmission ratio id' stored in the table 67 is thus determined.

When the operation of the ABS is terminated so that the motor vehicle returns to ordinary driving conditions, an ABS stop signal is fed to a transition control section 69 which is provided for preventing the transmission from rapidly downshifting when the difference between the actual transmission ratio and the desired transmission ratio is large. The transition control section 69 determines a transit range until the actual transmission ratio i coincides with the desired ratio id. During the transit range, the transmission ratio changing speed di/dt calculated by the calculator 49 is gradually increased.

In operation, while the vehicle is at a stop, the cylinder 10 of the driven pulley 8 is supplied with line pressure, and the primary cylinder 9 of the drive pulley 7 is drained, since $N_P$, $N_S$, and θ are zero and the duty ratio D is zero. Thus, in the pulley and belt device of the continuously variable belt-drive transmission, the drive belt 11 engages with the driven pulley 8 at a maximum running diameter to provide the largest transmission ratio (low speed stage).

When the accelerator pedal is depressed, the clutch current increases progressively with an increase of engine speed. The automatic clutch 2 is gradually engaged, transmitting the engine power to the drive pulley 7. The power of the engine is transmitted to the output shaft 6 at the largest transmission ratio by the drive belt 11 and driven pulley 8, and further transmitted to axles 17 of the driving wheels 16 through the intermediate shaft 13 and the differential 15. Thus, the vehicle is started. When the vehicle speed (output signal $N_s$) exceeds a predetermined value, the clutch 2 is entirely engaged.

When the throttle valve is opened for acceleration of the vehicle, the actual transmission ratio i is calculated by the actual transmission ratio calculator 45 based on the drive pulley speed $N_P$ and the driven pulley speed $N_S$ from the drive and the driven pulley sensors 41 and 42, respectively. The desired transmission ratio id is derived from the desired transmission ratio table 46 in accordance with the throttle opening degree $\theta$ from the throttle position sensor 44 and the driven pulley speed $N_S$. The desired transmission ratio changing speed did/dt is calculated by the desired transmission ratio calculator 47 based on the desired transmission ratio id. Thus the transmission ratio changing speed di/dt is calculated by the transmission ratio calculator 49 in accordance with the actual and desired transmission ratios and the coefficients K1 and K2. The duty ratio D is derived from the duty ratio table 50 in accordance with the transmission ratio changing speed +di/dt and the actual transmission ratio i.

A pulse signal which corresponds to the duty ratio D is fed to the solenoid operated valve 28 so as to operate the transmission ratio control valve 23 in the oil supply position or the oil drain position. Thus, the pressure applied to the drive pulley 7 is controlled, thereby controlling the transmission ratio.

When the actual transmission ratio i is larger than the desired transmission ratio id (id < i), the duty ratio D is set to a smaller value than 50% corresponding to the transmission ratio changing speed di/dt, which is fed to the solenoid valve 28. As a result, the transmission ratio control valve 23 is operated to supply the oil to the drive pulley 9 for a longer period than a draining period. Thus the pressure applied to the drive pulley 9 is increased so that the transmission is upshifted. On the other hand, if the actual transmission ratio i is smaller than the desired ratio id (id > i), the smaller duty ratio D than 50% is fed to the solenoid valve 28, thus rendering the transmission ratio control valve 23 to drain for a longer period. Consequently, the drive pulley 9 is drained, thereby downshifting the transmission. Hence, the actual transmission i continuously changes to converge to the desired ratio id in the entire range between the largest transmission ratio iL and the smallest transmission ratio iH.

The control operation of line pressure will be described hereinafter. The pump 20 driven by the engine 1 applies the oil to the line pressure control valve 22. When the engine torque Te obtained in accordance with the throttle opening degree $\theta$ and the engine speed Ne is large in a low engine speed range, the desired line pressure is large. The solenoid operated on-off valve 27 is operated at the duty ratio $D_L$ corresponding to the desired line pressure thus increasing the line pressure $P_L$. As the engine torque Te decreases in a high engine speed range, the line pressure $P_L$ is reduced. Thus, the power is transmitted through the transmission without slipping the belt 8.

When the brake pedal 31 is depressed during this driving condition, the master cylinder 32 produces the brake fluid pressure which is supplied to the brake devices 35 to brake the wheels. As a result, the vehicle speed and the driven pulley speed $N_S$ are decreased, so that the transmission ratio control section 50 operates the transmission ratio control valve 23 to downshift the transmission.

On the other hand, it is determined at the wheel lock determining section 63 if the wheels are going to be locked at a rapid deceleration of the wheel speed NF or NR. Namely, when the vehicle is braked on a road having a low friction coefficient, the front-wheel speed NF or the rear-wheel speed NR rapidly decreases as shown in FIG. 4b. The antilock controller 64 produces an ABS signal to increase, maintain or decrease the fluid pressure in accordance with the difference between the speed NF or NR and the pseudo vehicle speed Vc. The ABS signal is applied to the modulator 34 through the output controller 65 for regulating the pressure. Thus, the fluid pressure for the brake 35 is modulated as shown in FIG. 4c. Hence the wheel speed NF or NR is decreased corresponding to the actual vehicle speed VB without causing the locking of the wheels.

Meanwhile, the ABS operation determining section 66 determines that the ABS is operated in dependency on a signal such as the pressure reducing signal. Thus, the selecting section 68 selects the ABS desired transmission ratio id' instead of the desired transmission ratio id for ordinary driving conditions. If the actual transmission ratio i is equal to the smallest transmission ratio iH while braking, the ABS desired transmission ratio id' is maintained at the smallest transmission ratio iH until the vehicle speed reaches the low vehicle speed range (low driven pulley speed $N_S$), as shown in FIG. 3. Accordingly the transmission ratio changing speed di/dt becomes zero, or a very small value during the period where the front-wheel speed NF or the rear-wheel speed NR fluctuates.

Hence as shown in FIG. 4d, transmission ratio i is maintained at a small value close to the smallest transmission ratio iH for a time, thereby changing at a very small speed. Thus the influence of the ABS on the transmission ratio reduces. Therefore the pseudo vehicle speed Vc dependent on the front-wheel speed NF or the rear-wheel speed NR approaches the actual vehicle speed VB.

When the operation of the ABS is stopped, the ABS signal is not applied to the ABS operation determining section 66 which applies the ABS stop signal to the selecting section 68. Thus ordinary transmission control is resumed. The ABS stop signal is further fed to the transition control section 69, where the transit state is determined, so that the transmission ratio changing speed di/dt gradually increases. At that time, although the actual transmission i is at a small ratio, the desired transmission ratio id is set to a larger value in accordance with a low driven pulley speed $N_S$. As described above with reference to FIG. 4d, the transmission is slowly downshifted.

Figure 5B:
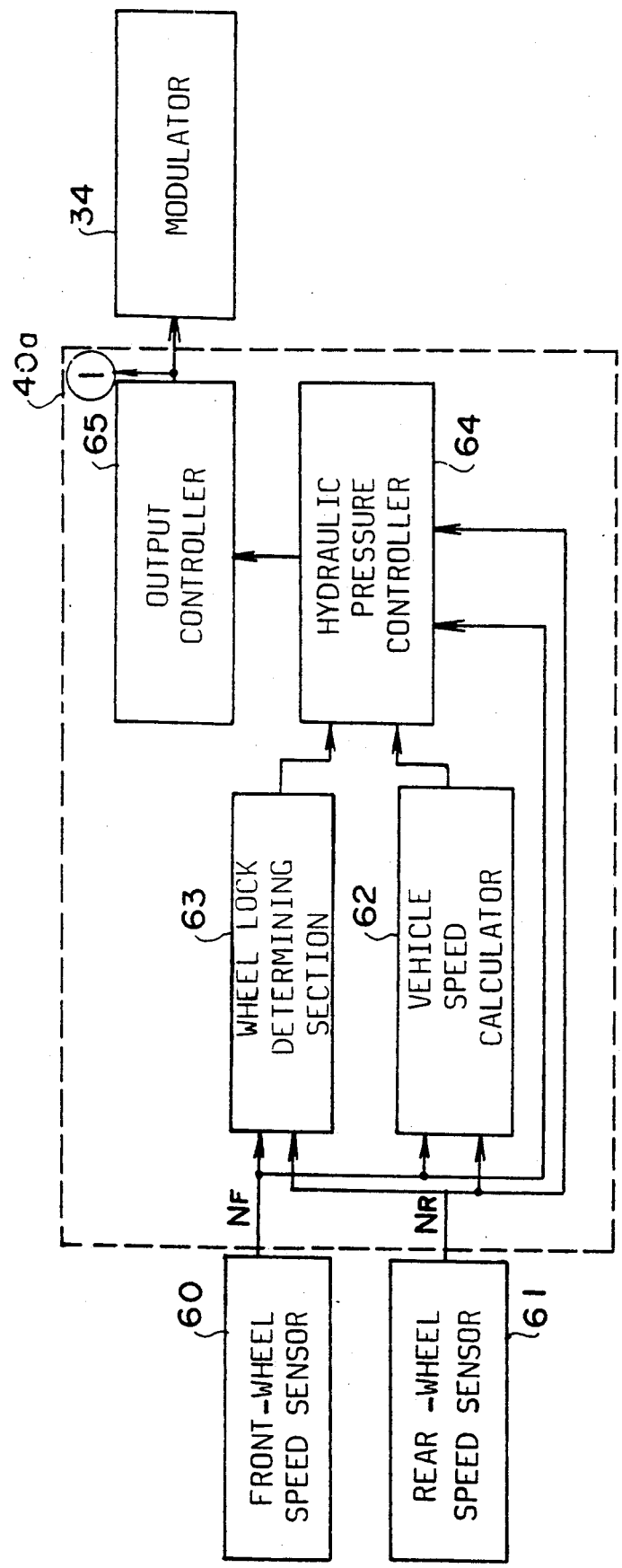

FIGS. 5a and 5b show a control unit 40a of the second embodiment of the present invention, similar to the control section 40 shown in FIGS. 2a and 2b. In the second embodiment, the transmission ratio changing speed after the operation of the ABS is controlled in accordance with the driving conditions.

The control unit 40a has a transition determining section 69a instead of the transition control section 69 of the first embodiment, a transmission ratio returning speed providing section 70 and a selecting section 71 in addition to the sections provided in the control unit 40.

Figure 6A:
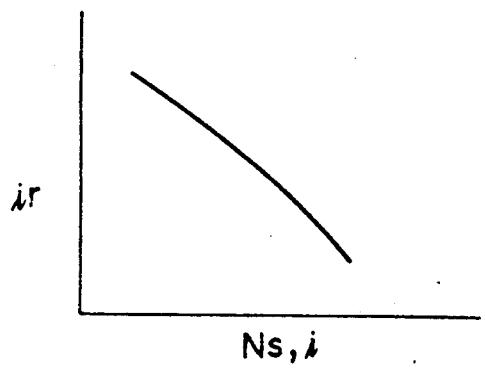
FIGS. 6a and 6b are graphs showing the characteristics of a transmission ratio returning speed.
Figure 6B:
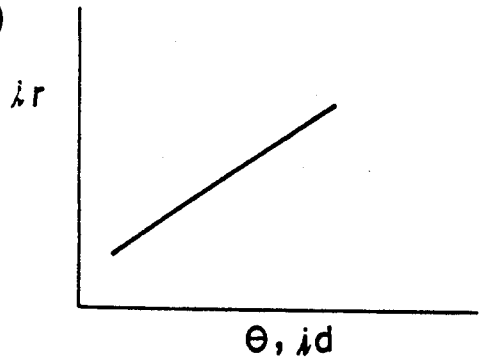

The transition determining section 69a is applied with the ABS stop signal from the ABS operation determining section 66, the desired transmission ratio id and the actual transmission i to determine a transition while the actual transmission ratio does not coincide with the desired ratio id after the ordinary driving conditions are recovered. The driven pulley speed $N_S$, the desired transmission ratio id, the actual transmission ratio i, the throttle opening degree $\theta$ and the engine torque Te are fed to the transmission ratio returning speed providing section 70 where a transmission ratio returning speed ir for the transition is determined. The transmission ratio returning speed ir is a decreasing function of the driven pulley speed $N_S$ and the actual transmission ratio i as shown in FIG. 6a, and an increasing function of the throttle opening degree $\theta$ and the desired transmission ratio id as shown in FIG. 6b. The transmission ratio returning speed ir for the transition, the transmission ratio changing speed di/dt calculated at the transmission ratio changing speed calculator 49 and the output signal of the transition determining section 69a are fed to the selecting section 71. The selecting section 71 selects the transmission ratio returning speed ir and applies the returning speed ir to the duty ratio table 50 when the transition is determined at the transition determining section 69a.

In operation, after the operation of the ABS, the transmission ratio returning speed ir is determined. In a vehicle speed range where the driven pulley speed $N_S$ is large, the actual transmission ratio i slowly increases to the desired ratio id to downshift the transmission as shown in FIG. 4e. To the contrary, in a low vehicle speed range, the actual mission ratio i is quickly converged to the desired ratio id so that the transmission ratio i becomes the largest transmission ratio iL without fail when stopping the vehicle. If the vehicle is to be re-accelerated, the transmission ratio i is quickly converged to the desired transmission id for the ordinary driving conditions.

When the actual transmission ratio i substantially coincides with the desired transmission ratio id, the transition determining section 69a determines that the vehicle is no longer in a transient state. Thus the selecting section 71 selects the transmission ratio changing speed di/dt from the transmission changing speed calculator 49. The transmission ratio changing speed di/dt is fed to the duty ratio table 50 so that the control system resumes an ordinary controlling operation. The other constructions and operation of the control unit 40a are the same as those of the control unit 40 of the first embodiment.

The present invention may be modified to maintain the ABS desired transmission ratio id' at a transmission ratio before the start of the downshift.

In accordance with the present invention, during the operation of the ABS, the transmission ratio of the continuously variable transmission is controlled so as to change at a small rate. Thus, the ABS can be accurately controlled, taking into account the relationship between pseudo vehicle speed and actual vehicle speed. The transmission ratio changing speed during the operation of the ABS is derived from a table, thereby facilitating the control. Since the transmission ratio does not change a lot, the vibration of the vehicle decreases and the durability of the belt of the transmission is improved. When the operation of the ABS is stopped, the transmission ratio is appropriately downshifted in accordance with various driving conditions, thereby preventing an excessive engine braking effect and slipping of the belt.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A system for controlling transmission ratio of a continuously variable belt-drive transmission connected to an engine mounted on a motor vehicle, having a drive pulley with a hydraulically shiftable disc and a primary hydraulic cylinder for shifting said disc, a driven pulley including a hydraulically shiftable disc and a secondary hydraulic cylinder for shifting said disc thereof, a belt engaged with both pulleys, a hydraulic circuit for supplying oil from a pump to said cylinders, a transmission ratio control valve for controlling a primary pressure applied to said primary cylinder, a line pressure control valve for controlling a secondary pressure applied to said secondary cylinder, a throttle position sensor for producing a throttle opening degree signal, speed sensors for detecting speeds of said drive pulley and driven pulley and said engine respectively and for producing respective speed signals, actual transmission ratio calculating means responsive to said drive pulley speed signal and driven pulley speed signal for calculating an actual transmission ratio and for producing an actual transmission ratio signal, desired transmission ratio calculating means responsive to said driven pulley speed signal and said throttle opening degree signal for calculating a desired transmission ratio and for producing a desired transmission ratio signal, valve operating means responsive to said actual transmission ratio signal and said desired transmission ratio signal for operating said transmission ratio control valve so as to control the transmission ratio to the desired transmission ratio, and an antilock brake system, the system comprising:

ABS operation detector means for detecting an output signal of said antilock brake system and for producing an ABS signal;

storing means for storing a plurality of ABS desired transmission ratios during an operation of said antilock brake system;

selecting means responsive to said ABS signal for obtaining an ABS desired transmission ratio from said storing means in place of said desired transmission ratio and for applying said ABS desired transmission ratio to said valve operating means; and said ABS desired transmission ratios being arranged to slowly control said actual transmission ratio to the ABS desired transmission ratio.

2. The system according to claim 1, further comprising
transition control means responsive to disappearance of said ABS signal for slowly returning the actual transmission ratio to said desired transmission ratio.

3. The system according to claim 2, wherein
speed of returning the actual desired transmission ratio is a decreasing function of driven pulley speed and actual transmission ratio and an increasing function of throttle opening degree and desired transmission ratio.

4. A system for controlling transmission ratio of a continuously variable belt-drive transmission connected to an engine mounted on a motor vehicle, the transmission comprising a drive pulley with a hydraulically shiftable first disc and a primary hydraulic cylinder for shifting said disc, a driven pulley including a hydraulically shiftable second disc and a secondary hydraulic cylinder for shifting said second disc, and a belt engaged with both pulleys, the system comprising a hydraulic circuit for supplying oil from a pump to said cylinders, the hydraulic circuit comprising a transmission ratio control valve for controlling primary pressure applied to said primary hydraulic cylinder, and a line pressure control valve for controlling secondary pressure applied to said secondary hydraulic cylinder, the system further comprising a throttle position sensor for producing a throttle opening degree signal, speed sensors for detecting speeds of said drive pulley, said driven pulley and said engine, respectively, and for producing drive pulley, driven pulley and engine speed signals respectively, actual transmission ratio calculating means responsive to said drive pulley speed signal and said driven pulley speed signal for calculating an actual transmission ratio of the transmission and for producing an actual transmission ratio signal, desired transmission ratio means responsive to said driven pulley speed signal and said throttle opening degree signal for calculating a desired transmission ratio and for producing a desired transmission ratio signal, valve operating means operatively responsive to said actual and desired transmission ratio signals for operating said transmission ratio control valve for controlling the actual transmission ratio to the desired transmission ratio, and an antilock brake system, the controlling system further comprising:

said valve operating means being responsive to said transmission ratio changing speed signal;

ABS operation detector means for detecting an output signal of said antilock brake system and for producing an ABS signal;

storing means for storing a plurality of ABS desired transmission ratios for use during operation of said antilock brake system;

selecting means responsive to said ABS signal for obtaining an ABS desired transmission ratio from said storing means and for applying said ABS desired transmission ratio to said valve operating means via said transmission ratio changing speed calculator means, in place of said first-mentioned desired transmission ratio; and said ABS desired transmission ratios being arranged to slowly control said actual transmission ratio to the ABS desired transmission ratio so as to prevent excessive engine braking effect and improve durability of the belt.

* * * * *